United States Patent
Chen et al.

(10) Patent No.: US 6,961,179 B2
(45) Date of Patent: Nov. 1, 2005

(54) COMPENSATED COLOR MANAGEMENT SYSTEMS AND METHODS

(75) Inventors: Jianmin Chen, Superior, CO (US); Michael G. Robinson, Boulder, CO (US); Gary D. Sharp, Boulder, CO (US); Jonathan R. Birge, Cambridge, MA (US)

(73) Assignee: Colorlink, Inc., Boulder, CO (US)

( * ) Notice: Subject to any disclaimer, the term of this patent is extended or adjusted under 35 U.S.C. 154(b) by 195 days.

(21) Appl. No.: 10/294,426

(22) Filed: Nov. 14, 2002

(65) Prior Publication Data

US 2003/0227680 A1 Dec. 11, 2003

Related U.S. Application Data (63) Continuation-in-part of application No. 10/000,227, filed on Nov. 30, 2001, now Pat. No. 6,816,309.
(60) Provisional application No. 60/389,565, filed on Jun. 18, 2002.

(51) Int. Cl.[7] .................... G02B 27/10; G02B 27/28; G03B 21/14
(52) U.S. Cl. .................... 359/485; 359/497; 359/499; 359/634; 353/20; 353/31; 353/34; 349/9
(58) Field of Search .................... 359/634, 483, 359/485, 487, 497, 498, 499; 353/20, 31, 34; 349/9

(56) References Cited

U.S. PATENT DOCUMENTS

| | | |
|---|---|---|
| 2,347,582 A | 4/1944 | Ulffers |
| 2,607,272 A | 8/1952 | Bond |
| 3,835,459 A | 9/1974 | Luke et al. |
| 4,461,542 A | 7/1984 | Gagnon |
| 4,500,178 A | 2/1985 | Yeh |
| 4,548,479 A | 10/1985 | Yeh |
| 4,772,104 A | 9/1988 | Buhrer |
| 4,991,938 A | 2/1991 | Buhrer et al. |
| 5,062,694 A | 11/1991 | Bair |
| 5,202,744 A | 4/1993 | Louis |
| 5,374,968 A * | 12/1994 | Haven et al. .................. 353/31 |
| 5,375,006 A | 12/1994 | Haas |
| 5,534,949 A * | 7/1996 | Baron .................. 348/742 |
| 5,619,352 A * | 4/1997 | Koch et al. .................. 349/89 |
| 5,751,384 A | 5/1998 | Sharp |

(Continued)

FOREIGN PATENT DOCUMENTS

WO     WO 02/37175 A1 *   5/2002

OTHER PUBLICATIONS

International Search Report from copending PCT/US03/36803 application mailed Apr. 27, 2004.

Primary Examiner—John Juba, Jr.
(74) Attorney, Agent, or Firm—Baker & McKenzie, LLP (57) ABSTRACT

Disclosed are color management architectures used in video projection systems including, for example, retarder stacks sensitive to the symmetries between input and output polarizer configurations that provide the polarization transformations that will comprise for skew rays, such that normal incidence performance is maintained for all incident light. Additionally, also disclosed are systems that utilize color selective polarization (CSP) filters and polarizing beam splitting elements such that an output analyzer is not required. One exemplary CSP architecture includes two CSPs, a single polarizing beam splitting element combination for splitting and combining light between two of the three panels, and an output polarizing beam splitting element used as an analyzer such that a single CSP is in the projection path. In all such architectures, an output CSP and clean up polarizer directly in line with the projection optics need not be included, thereby increasing transmission, improving imaging crispness, and reducing cost.

25 Claims, 5 Drawing Sheets

U.S. PATENT DOCUMENTS

| | | | |
|---|---|---|---|
| 5,892,612 A | 4/1999 | Miller et al. | |
| 5,986,815 A | 11/1999 | Bryars | |
| 6,042,234 A | 3/2000 | Itoh | |
| 6,089,719 A | 7/2000 | Lin | |
| 6,113,239 A | 9/2000 | Sampsell et al. | |
| 6,183,091 B1 | 2/2001 | Johnson et al. | |
| 6,309,071 B1 * | 10/2001 | Huang et al. | 353/31 |
| 6,339,492 B1 | 1/2002 | Terahara et al. | |
| 6,343,864 B1 * | 2/2002 | Tajiri | 353/20 |
| 6,373,614 B1 | 4/2002 | Miller | |
| 6,375,330 B1 | 4/2002 | Mihalakis | |
| 6,384,972 B1 | 5/2002 | Chuang | |
| 6,419,362 B1 | 7/2002 | Ikeda et al. | |
| 6,454,416 B2 * | 9/2002 | Aoto et al. | 353/31 |
| 6,490,087 B1 * | 12/2002 | Fulkerson et al. | 359/487 |
| 6,577,445 B1 | 6/2003 | Damask | |
| 2002/0001135 A1 * | 1/2002 | Berman et al. | 359/640 |
| 2002/0003610 A1 * | 1/2002 | Park et al. | 353/31 |
| 2002/0063818 A1 * | 5/2002 | Anderson et al. | 349/96 |
| 2002/0089679 A1 * | 7/2002 | Yi et al. | 358/1.9 |
| 2002/0105619 A1 | 8/2002 | Lin | |
| 2002/0154420 A1 * | 10/2002 | Magarill et al. | 359/831 |
| 2003/0025880 A1 * | 2/2003 | Newell et al. | 353/20 |
| 2003/0227597 A1 * | 12/2003 | Silverstein et al. | 353/20 |

* cited by examiner

COMPENSATED COLOR MANAGEMENT SYSTEMS AND METHODS

PRIORITY CLAIM AND RELATED APPLICATIONS

This application is a continuation-in-part of U.S. application Ser. No. 10/000,227, filed Nov. 30, 2001, now U.S. Pat. No. 6,816,309 and is a continuation-in-part of provisional U.S. application Ser. No. 60/389,565, filed Jun. 18, 2002. The disclosures of these two applications are hereby incorporated by reference in their entirety for all purposes.

FIELD OF THE INVENTION

The present invention relates generally to color management in projection displays and, more particularly, to color management architectures for three-panel projection systems that utilize color selective polarization filters (CSPF) and polarizing beam splitting (PBS) elements.

BACKGROUND

It is generally desirable for projection system to produce high quality images while being compact and inexpensive. In prior-art transmissive systems using polysilicon liquid-crystal panels, high contrast is achieved by situating each panel between crossed sheet polarizers. Color management beam splitters/combiners and other optics are external to these units, insuring that polarization is not contaminated and contrast degraded.

In projection systems using reflective panels, such as liquid crystal on silicon (LCoS) displays, beam routing is frequently accomplished using polarizing beam splitters FBSs). PBSs are four-port devices, comprising an input port, an output port, and a reflective panel port, with the fourth port typically unused. The behavior of thin-film FBS cubes, for instance, is such that s-polarized light is reflected, while orthogonal, p-polarized light is substantially transmitted.

SUMMARY

The present invention relates to color management architectures in video projection systems. Specifically, the described architectures employ up to four polarizing beam-splitter cubes (PBSs) to achieve color separation and recombination of red, green and blue primary color bands or spectra to illuminate and project light from three reflective video display panels. Color separation and recombination with the PBSs is achieved through polarization encoding of the separate color bands by color selective polarization filters (CSPFs). These architectures further provide for systems in which the constituent PBSs are used to analyze the reflected light and which do not require external polarizing elements for light analysis. Two of the three display panels are analyzed in transmission by their neighboring PBSs, whereas the third panel, which shares a PBS with another, is analyzed in transmission either by the output PBS or an internal analyzing polarizing element.

For the described color management architectures, the three display panels are placed in an 'L'-shaped three-cube assembly whose output post is defined. Unlike prior three-panel/three-PBS architectures, which "notch" out the green spectrum from between the red and blue spectra for individual manipulation by a PBS/display panel couplet, see, e.g., U.S. patent application Ser. No. 2002/0001135, certain of the present architectures can separate either blue or red first, leaving colors from adjacent wavelength bands to be manipulated between two panels by a single PBS. To accomplish this management of adjacent color bands through a single PBS, the present application recognizes the ability to mismatch CSPFs to avoid color cross-talk in the region between the adjacent color bands. This allows blue light, for example to be treated separately to improve its contrast, which is an advantage because in many color management systems, blue contrast can be the most difficult to control. Other advantages of routing colors of adjacent wavelength bands to be manipulated between two panels by a single PBS include being able to tailor more effectively the PBS performance to the color bands that are then continuous in wavelength.

Skew ray compensating color-selective polarizing filters (CCSPfs) are also provided in embodiments described below, and they are particularly effective between adjacent PBSs and in physically compact, high angle illumination (low f/#) implementations.

DETAILED DESCRIPTION

Figure 1:
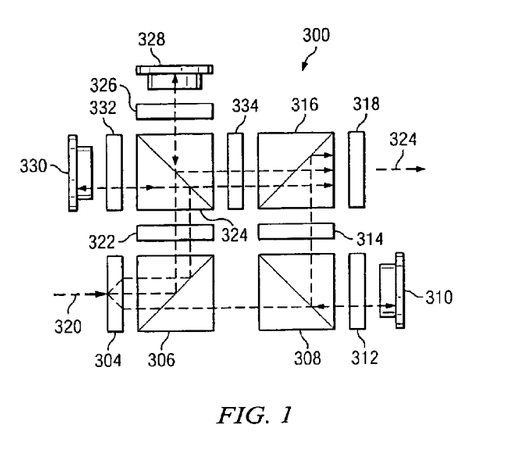
FIG. 1 shows an exemplary four PBS or "quad" color management system.

FIG. 1 shows an exemplary four PBS or "quad" color management system 300. In the system 300, s-polarized white light 320 is incident on a first CSPF 304 that converts light of a first spectrum to the orthogonal polarization that is subsequently transmitted through the first PBS 306. Light that is complementary to the first spectrum remains s-polarized and is subsequently reflected by the first PBS 306. Light having the first spectrum is then transmitted by a second PBS 308 and is subsequently incident upon a first reflective panel 310, which includes an optional quarter-wave plate 312. In the ON-state, light reflected from the first reflective panel 310 is converted from p-polarization to s-polarization, thereby enabling the second PBS 308 to reflect the light through a first O-oriented half-wave plate 314. The light is then reflected by a third PBS 316. The third PBS 316 reflects the first spectrum into a second CSPF 318, which converts light of the first spectrum to p-polarization, which it is then analyzed by a clean-up polarizer 324.

The incident light 320 of second and third spectrums are reflected by the first PBS 306 onto a first compensating color selective polarization filter (CCSPF) 322, which reflects the state of polarization (SOP) of the second spectrum about a ±π/4 axis. Light of the second spectrum is transmitted through a fourth PBS 324 to a second reflective panel 328, which includes an optional quarter-wave plate 326. The first CCSPF 322 retains the SOP of the third spectrum. The third spectrum is subsequently reflected by the fourth PBS 324 to a third reflective panel 330, which includes an optional quarter-wave plate 332. In the ON-state, light reflected from the second and third reflective panels 328, 330 returns to the fourth PBS 324 with orthogonal states, so that light in the second and third spectra is incident on a second CCSPF 334. The second CCSPF 334 reflects the SOP of the second spectrum about a $\pm\pi/4$ axis, thus restoring both spectra to p-polarization. The p-polarized light is then transmitted by the third PBS 316, the second CSPF 318 and the clean-up polarizer 324. The optional quarter-wave plates situated between each panel and PBS are configured to provide skew ray correction.

Figure 2:
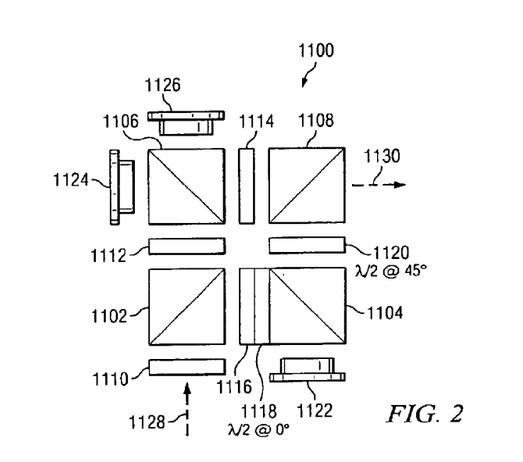
FIG. 2 shows an exemplary four PBS color management architecture for a projection system that does not incorporate an external exit analyzer.

FIG. 2 illustrates an exemplary color management architecture 1100 that does not require an output analyzer. It includes first, second, third and fourth polarizing beam splitting elements 1102, 1104, 1106, 1108, a first CSFF 1110, a second CSPF 1112, a third CSPF 1114, an optional color filtering element 1116, an optional half-wave plate 1118 oriented at 0°, a half-wave plate 1120 oriented at 45°, a first reflective panel 1122, a second reflective panel 1124 and a third reflective panel 1126 that operate to modulate a polarized input light beam 1128 to produce an output light beam 1130. The polarized input light beam 1128 is incident upon the first CSPF 1110 which transforms the polarization such that light that is to be incident upon the first reflective panel 1122 is orthogonally polarized to the light which is to be incident upon the second and third reflective panels 1124, 1126. Depending upon the polarization of the polarized input light beam 1128, this may be achieved by having the CSFF 1110 introduce an appropriate amount of polarization rotation at certain wavelengths. The light is then incident upon the first polarizing beam splitting element 1102, which substantially transmits light of one polarization and substantially reflects light of another polarization. The polarizing beam splitting element may be a conventional cube polarizing beam splitter, a wire grid polarizer or any other suitable polarizing beam splitting element.

An optional color-filtering element 1116 such as a transmitting dichroic mirror may be included to remove any light outside of the desired spectrum of the reflected light. An optional half-wave plate 1118 oriented at 0° may be included to compensate for skew rays as is discussed in pending application 10/000,227, reference above.

The reflected light then is incident upon the second polarizing beam splitting element 1104 that reflects the reflected light to form twice-reflected light. The twice-reflected light then is incident upon the first reflective panel 1122 that modulates and reflects the twice-reflected light. The twice-reflected light (the reflections that are being counted are limited to the reflections caused by the polarization beam splitting elements 1102, 1104, 1106, 1108) then travels through the second splitting element to half-wave plate 1120 oriented at 45°. The half-wave plate 1120 rotates the polarization of the twice-reflected light to the orthogonal polarization direction such that the fourth polarizing beam splitting element 1108 will reflect the twice-reflected light a third time to form thrice-reflected light. The thrice-reflected light is output from the polarizing beam splitting element 1108 to form part of the output light beam 1130. The output light beam may be projected by any suitable projection optics or may otherwise be imaged for display.

The light that is transmitted through the first polarizing beam splitting element 1102 is incident upon a second CSPF 1112 that rotates part of the remaining spectrum such that the third polarizing beam splitting element 1106 will reflect part of the light to the second reflective panel 1124 and allow the remaining part of the light to be transmitted through the third polarizing beam splitting element 1106 to the third reflective panel. The second reflective panel 1124 modulates and reflects the light back through the third polarizing beam splitting element 1106 to the third CSPF 1114. The third CSPF 1114 does not rotate polarization of the light emitted from the second reflective panel 1124 such that the light will be transmitted through the fourth polarizing beam splitting element 1108 and become part of the output light beam. The third reflective panel 1126 modulates and reflects the light back into the third polarizing beam splitting element 1106, which reflects the light from the third reflective panel 1126 toward the third CSPF 1114. The third CSPF 1114 rotates polarization of the light reflected from the third reflective panel 1126 such that the light will be transmitted through the fourth polarizing beam splitting element 1108 and become part of the output light beam.

The light from the second and third reflective panels 1124, 1126 is reflected once by the third polarizing beam splitting element 1106 and is transmitted through the first, third and fourth polarizing beam splitting elements 1102, 1106, 1108. Conversely, the light from the first reflective panel 1122 is transmitted once by the second polarizing beam splitting element 1104 and is reflected transmitted through the first, second and fourth polarizing beam splitting elements 1102, 1104, 1108. By recognizing that the different frequencies of light have different throughput efficiencies and by recognizing that the polarizing beam splitting elements are more efficient reflectors than transmitters, a projection device 1100 may be designed and fabricated. Specifically, the least efficient spectrum of light selected for direction to the first reflective panel 1122 so as to be offset by the higher efficiency of PBS elements. This constraint during design may allow greater design freedom, greater throughput and obviates the need for an output polarizer.

Figure 3:
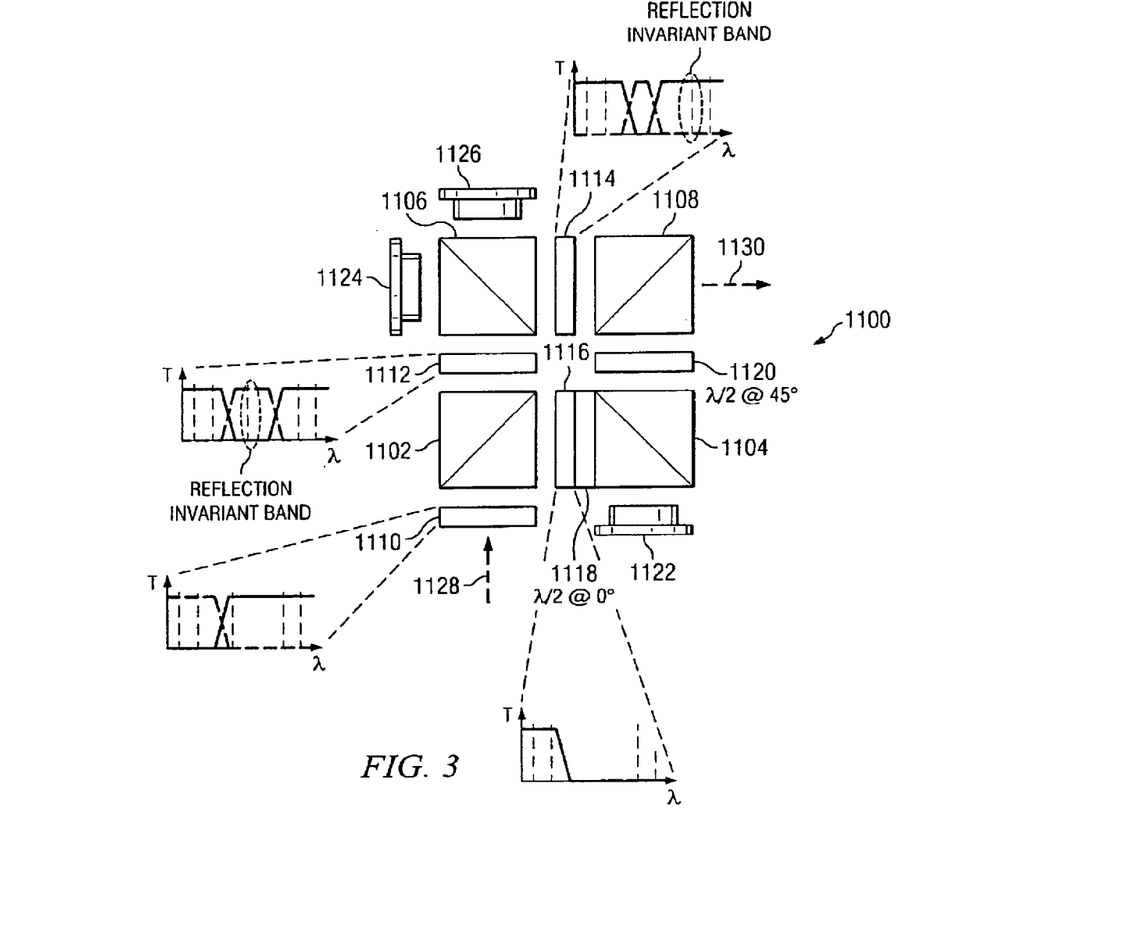
FIG. 3 shows a specific embodiment of the architecture shown in FIG. 2.

FIG. 3 illustrates an exemplary embodiment of FIG. 2 where blue light is directed to the first reflective panel 1122, green light is directed to the second reflective panel 1124 and where red light is directed to the third reflective panel 1126. In this example, the first CSPF 1110 is a blue/yellow CSPF, the optional color filtering element 1116 is a blue color filter, the second CSPF 1112 is a green/magenta CSPF and the third CSPF 1114 is a magenta/green CSPF. In practice it is advantageous to make the CSPFs 1112, 1114 green/magenta and magenta/green, respectively, to minimize the number of birefringent films for a given spectral transition steepness. However, the CSPFs 1112, 1114 of green/red and red/green, respectively, may be used. Alternatively, the second and third reflective panels 1124, 1126 may be switched which changes the second CSPF 1112 is a red/cyan CSPF and the third CSPF 1114 is a cyan/red CSPF. Alternatively, any combination of spectra may be used and/or any type of CSPF may be used provided light is directed the desired light paths.

To avoid 580 nm yellow light leaking from the green and red panels in a absence of any external yellow notch filter, the green/magenta and magenta/green CSPFs must not overlap more than about 10% in their spectra with the yellow transition of the green/magenta CSPF being at a longer wavelength than the magenta/green CSPF. By keeping the overlap to less or equal to about 10%, 580 nm light is substantially absent from the projected spectrum. Thus, saturated green and red colors are achieved without further filtering.

The yellow cut-off of the green/magenta determines the red color saturation and as such should be about 595 nm when an industry standard UHP lamp is used. The yellow cut-off of the magenta/green filter determines the longest green wavelengths and as such should be close to 570 nm for the UHP lamp. As explained above the slope of these yellow transitions must ensure <10% overlap so 10–90% slopes must be <25 nm. The transition of the blue dichroic mirror should determine spectrum of the blue channel. In the case of the UHP, the transition may be anywhere between 480–520 nm and will have subtle effects on system colorimetry and brightness. In practice, this transition should be short such that the longer blue/yellow transition makes negligible the p-polarized cyan light incident on the blue panel and the blue-yellow transition should not be too long to avoid making the green color too yellow. A good compromise is to have the dichroic cut-off at 495 nm and the blue/yellow to have a 510 nm cut-off. The cyan cut off of the green/magenta and the magenta/green CSPFs if shorter than that of the blue/yellow CSPF may be ignored. If the cut off is longer than the blue/yellow, the cut off for the green/magenta CSPF should be shorter than the cut off for the magenta/green CSPF for contrast. Thus, the magenta/green CSPF determines the cyan cut-off of the green spectrum and should be 530 nm or less.

Additionally, skew my depolarization compensation may be included because contrast is typically given precedence over throughput. For this reason, the CSPFs affect on contrast may merit compensation. In the case of the green/magenta CSPF 1112 sandwiched between polarizing beam splitters, a rotationally invariant CCSPF design with a half waveplate at 0 degrees optimized for wavelengths 20 nm either side of 550 nm may be used. For the magenta/green, a rotationally invariant CCSPF design with an additional half wave designed to operate in the red is desired. For the blue channel the output polarization rotator should have the reflection symmetry of a retarder making a single half-wave plate at 45° a suitable choice. For the input side, a half wave at 0° between the input and blue polarizing beam splitter would negate adverse depolarization effects between these elements and increase blue contrast. For the input CSPF 1110, an o-plate would increase the blue contrast although including an o-plate may not be cost effective for systems with an f/#>2.5.

Figure 4:
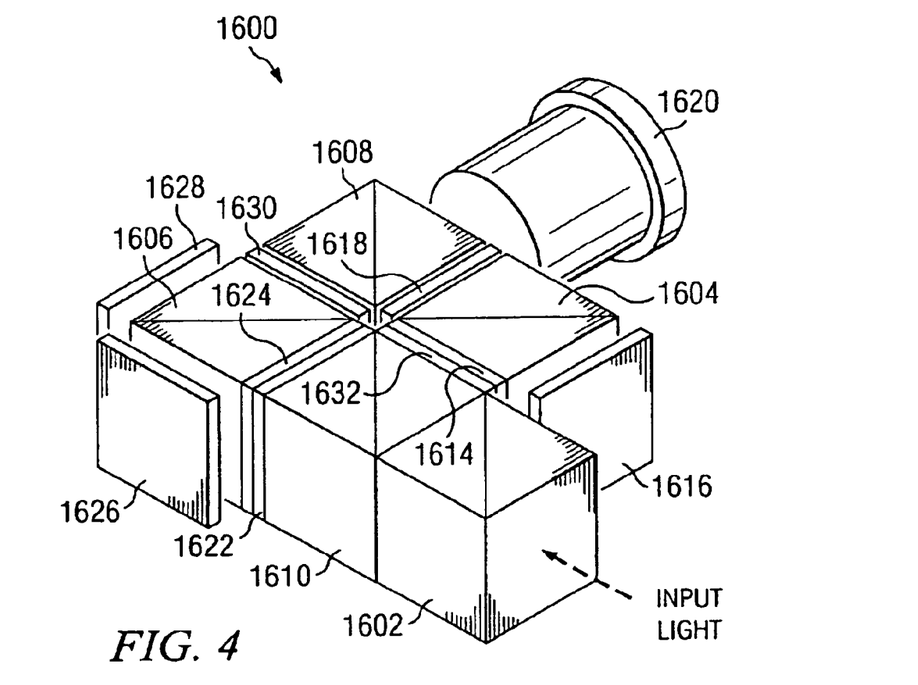
FIG. 4 shows an exemplary four PBS/single dichroic cube color management architecture for a projection system that does not incorporate an external exit analyzer.

FIG. 4 is another exemplary embodiment of a system without an external analyzer and containing an improved skew-ray compensated illumination stage. It includes four PBSs 1602, 1604, 1606 and 1608 and one 45° embedded dichroic beam splitter 1610. The first PBS 1602 is an input pre-polarizing PBS that improves performance by avoiding degradation form birefringence effects in the 45° dichroic coating. This is also advantageous as it has a lower cost and higher performance as compared with durable polarizers.

Light enters the first PBS 1602 a clean up PBS prior to a 45° embedded dichroic splitter 1610, where p-polarized blue light is reflected and separated from the transmitted red and green light. The blue light is then spectrally cleaned up by a blue transmitting normally incident dichroic 1632 that strips off reflected green and red p-polarization light. A first half-wave plate 1614 then rotates the polarization axes making the blue primarily s-polarized and at the same time correcting for skew ray polarization rotation. The s-polarized blue light reflects off the second PBS 1604 and illuminates a blue panel 1616. In the ON-state, this light gets transformed into p-polarized light by the blue panel 1616 and is transmitted though the second PBS 1604. A second half-wave plate 1618 at 45° transforms the polarization back to a, resulting in reflection of the light by the fourth PBS 1608. This light is then projected by the projection optics 1620.

The p-polarized green and red light transmitted through the dichroic beam splitter 1610 may have a blue light component depending on the performance of the dichroic coating of the dichroic beam splitter 1610. To avoid contamination of the red spectrum, this blue light is filtered out with the optional, normally incident, yellow transmitting device 1622. The color bands of the transmitted light are then separated by the green/magenta CSPF 1624, into s-polarized green and p-polarized red components so that the third PBS 1606 adjacent the green panel 1626 and red panel 1628 act to separate light to the traveling to the panels 1626, 1628 then combine the reflected light. The combined light exits the third PBS 1606 opposite the green panel 1626 when the panels are ON and a magenta/green CSPF 1630 acts to rotate the green polarization relative to the red producing yellow p-polarized light. This light is transmitted through the fourth PBS 1608 and is projected together with the s-polarized blue light from the blue panel 1616. The system 1600 may be further improved by including a blue dichroic filter 1632 that filters out non-blue light.

Unwanted yellow 575–590 nm light is incident on the green panel 1626 since it is treated as green by the input 'wide-spectrum' green/magenta filter 1624, whereas the narrower magenta/green filter 1630 treats this wavelength with the longer red wavelengths. As such, this yellow light is s-polarized prior to entering the fourth PBS 1608 and is not projected allowing saturated primary colors to be projected.

FIG. 4 yields good contrast when green leakage is controlled by the methods described above. Further improvement in contrast generally results if care is taken with regards the polarization integrity in the illumination arm. From a spectral standpoint, the dichroic coating of the dichroic beam splitter 1610 may have good performance for p-polarized light and may have poor performance for s-polarized light. In fact, no specific affect on s-polarized light is required as there should be minimal s-polarized light incident upon it. However low transmission of s-polarization may reduce the specification of the first PBS 1602 with regards to Ts in the green and red parts of the spectrum.

The dichroic beam splitter 1610 is embedded in a glass cube to reduce system size and lower the incident illumination ray angles of the telecentric illumination. Telecentricity is advantageous, in general, to avoid polarization mixing since integral lenses act to depolarize light. Also the embedding of the dichroic in glass matches the geometric polarization axis rotation for skew rays between the successive beamsplitting cubes. This is advantageous because light rays that are not well polarized along either s or p-polarization axes of a dichroic splitter experience birefringence that degrades polarization and impair system performance. This is the reason for using the first PBS 1602 with a parallel-coated surface since the first PBS 1602 acts to polarize each ray correctly and avoids polarization mixing at the dichroic interface. Glass index mismatch between the prisms embedding the dichroic coating and the glass index of the other prisms in the system 1600 results in a minimal amount of geometric polarization mismatch.

Embedding a dichroic mirror separates the transition bands for s and p-polarized light. This results in dichroic beam splitter 1610 acting like a PBS for certain regions of the visible spectrum. In FIG. 4, this may act to clean up the green and red polarization. Additionally, embedding the dichroic coating in a higher index acts to cut down the ray angles incident on the dichroic coating and reduces the broadening effect incident angles have on the transition slope. This improves the performance of the system 1600.

Advantageously, a low elasticity glass material may be use to reduce stress birefringence.

The light between the transition regions of the green/magenta and magenta/green filters 1624, 1630 may be analyzed by the third PBS 1606. The leakage at these wavelengths, assuming no external filtering, is simply the transmission of s-polarized light of the third PBS 1606. Since the cyan light entering the third PBS 1606 may be controlled by band-pass dichroics, the yellow light between about 575 to about 590 nm will be sufficiently filtered if Ts is low (e.g., the third PBS 1606 has a TA<0.05%). However, the near conflicting desire of having a high Tp value either side of this spectral region for the third PBS 1606 makes it advantageous to control this yellow light separately. For example, free-standing, low cost, antireflective coated polycarbonate yellow/neutral filter, such as a Y/N CSPF may be used where polarization conversion illumination systems are utilized without additional polarizers. Alternatively, a yellow/neutral dichroic or a doped absorption glass filter may be used.

Figure 5:
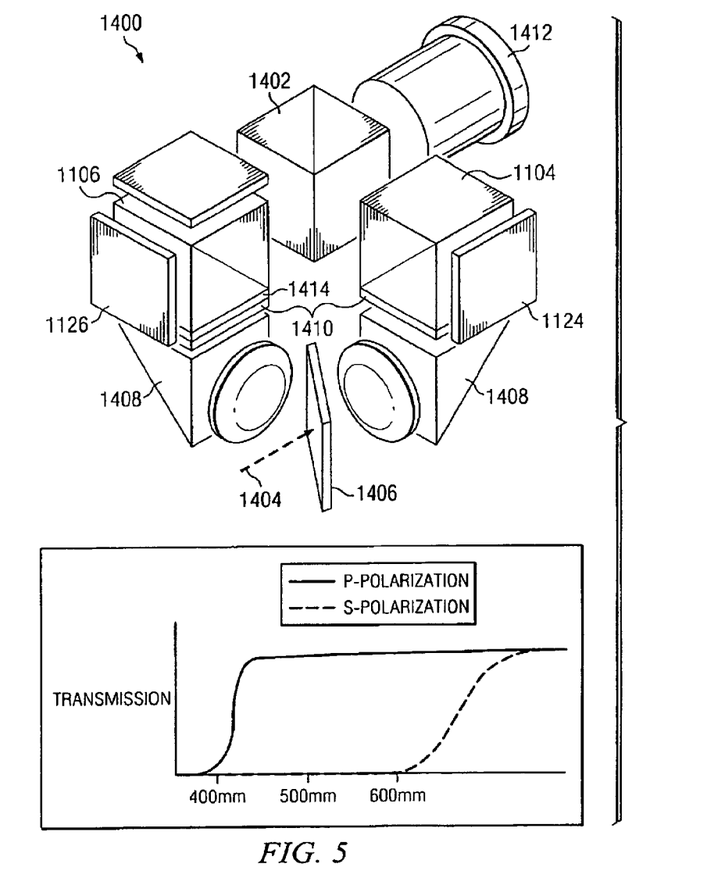
FIG. 5 illustrates a color management system employing neither analyzer nor color selective filter in the projection path.

FIG. 5 illustrates a projection device 1400 that avoids using an output CSPF from the shared PBS 1106 by introducing an output chromatic polarizing beam splitting element 1402. The projection device 1400 receives unpolarized input light 1404 that is incident upon a graded dichroic 1406. The graded dichroic 1406 divides the light by color into two beams. Those beams are each coupled by a coupling element 1408 to a polarizer 1410. The first beam (e.g., greenlight) is reflected by the polarizing beam splitting element 1104 onto the first reflective panel 1124. The reflective panel 1124 modulates and reflects the light back through the polarizing beam splitting element 1104 and into the chromatic polarizing beam splitting element 1402, which in turn reflects the light into the projection optics 1412.

The second beam (e.g., red and blue light) has part of its spectrum (e.g. red) transformed in polarization by the CSPF 1414 so as to be incident upon a second relative panel 1126 by reflection off the PBS 1106. The orthogonally polarized light (e.g. blue) is incident upon a third reflective panel 1128. The second and third panels 1126, 1128 modulate and reflect the light back to the polarizing beam splitting element 1106. The polarizing beam splitting element 1104 transmits light from the second panel 1126 and reflects light from the third panel 1128. The light from the polarizing beam splitting element 1104 is then incident upon the chromatic polarizing beam splitting element 1402.

The chromatic polarizing beam splitting element 1402 lets the light from the second reflective panel 1126 be transmitted through the chromatic polarizing beam splitting element 1402 to the projection optic 1412 because the chromatic polarizing beam splitting element 1402 is isotropic to light of that color (e.g., red). For light of any other color, the chromatic polarizing beam splitting element 1402 acts like the other polarizing beam splitting elements 1104, 1106. However, the chromatic polarizing beam splitting element 1402 is oriented orthogonally to the other beam splitting elements 1104, 1106. This orthogonal orientation causes the chromatic polarizing beam splitting element 1402 to reverse the polarizations that are transmitted and reflected. Thus, FIG. 5 eliminates the need for any CSPFs between the reflective panels 1122, 1124, 1126 and the chromatic polarizing beam splitting element 1402.

Alternatively, trim dichroic filters to avoid projecting the unwanted yellow light may also be included in FIG. 5. Lenses that allow the input to be non-telecentric through the dichroic reducing the overall component size may be incorporated into the coupling elements 1408, which may be glass prisms. Alternatively, the graded, dichroic may be replaced by a further polarizing beam splitting element and a CSPF to improve illumination angular tolerance, with the orientation (0° or 90°) of the input light being selected by the dichroic or CSPF performance.

Figure 6:
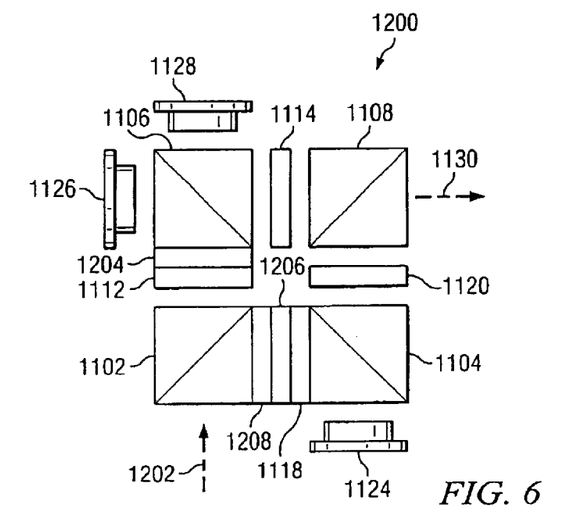
FIG. 6 shows an exemplary four PBSs color management architecture with internal polarizing elements in the illumination path.

FIG. 6 illustrates a projection device 1200 that is a derived from the system of FIGS. 2 and 3, but uses unpolarized input light 1202. To maintain good polarization in the reflected port of the input PBS 1102 an internal polarizer 1208 is required. The polarizer 1208 can be a film-type absorbing polarizer on a suitable substrate, or a wire grid reflecting polarizer, or an alternative element that is capable of polarizing light reflected from the PBS 1102. The use of dichroic filters 1204, 1206 at each of the output ports of the first polarizing beam splitting element 1102 allows for the use of the unpolarized white input light 1202 by removing unwanted optical wavelengths at the entrance to the PBS cubes 1104 and 1106. In the case where the labeled components operate as in the system shown in FIG. 3, the optional filters 1118 and 1112 would transmit essentially blue and yellow wavelengths respectively. This embodiment has the advantage of overlapping color spectra. For example, when the first reflective panel 1124 is a blue reflective panel, the polarized cyan light may be part of the projected green spectrum and s-polarized cyan may be added to the projected blue light.

Figure 7:
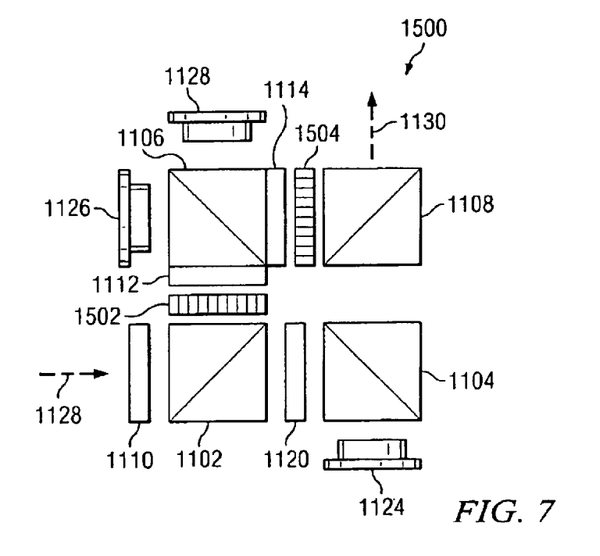
FIG. 7 shows an exemplary four PBSs color management architecture with internal polarizing elements in both the illumination and projection paths.

FIG. 7 illustrates a projection system 1500 with internal polarizers 1502, 1504 in both illumination and projection paths of the system. The internal polarizers 1502, 1504 let the panel 1126 be facing the propagation direction of the output light 1130 and thus along the axis of the projection optics (not shown). FIG. 7 has good phase flatness, allows leakages in the output CSP 1114 without encoding the contrast of the sub-system, negates the need for good pre-polarizing and post analyzing elements, and may have other advantages.

In all the above projection systems that use cubes as beam splitting elements, there exists a geometric symmetry that can be solved by a retarder-based compensation scheme as described explicitly in some cases. The components are sandwiched between cubes that have reflecting surfaces that are at 45 degrees to the beam propagation direction, and can be parallel or orthogonal. Retarder based compensators between cubes act to transform polarization through rotation or reflection for the parallel or orthogonal reflecting surface situations respectively. In a four-cube system or a five-cube system, CCSPFs are placed between the cubes and can be used as skew ray compensators if they have these transformation properties. In systems such as projection devices 200 and 1500, where input linear polarization is imposed by internal polarizers, o-plates can be used to compensate skew rays prior to the light entering PBSs.

The embodiments described above provide an efficient means of the splitting and recombining color chemicals while maintaining good polarization and high contrast. These embodiments can be configured to achieve very high sequential contrast and possibly enhance other system performance criteria such as:

1. ANSI contrast—by reducing reflection surfaces in the projection path;
2. Soft focus—by reducing non-phrase flat components and reflecting surfaces in the projection path;
3. The sequential contrast of a color—by isolating the color channel (e.g. blue);
4. Physical compactness—by introducing a 90° angle between input and output transmission axes;

5. Brightness at high white color temperatures—by increasing blue transmission; and
6. Durability—by removing the output absorbing sheet polarizer.

Further embodiments may act to improve upon some or all of these performance criteria.

The system performance criteria may be improved at the expense of sequential photopic contrast and component specification. Such improvements may be incorporated since PBS cubes with improved transmission of p-polarized light are commercially available and since sequential contrast may not be limiting when compared with off state color and ANSI contrast.

Exemplary light sources include ultra-high pressure mercury arc lamps with a small arc size such as is available from Ushio, Toshiba, Perkin-Elmer, Phoenix and others. These light sources are rich in green and blue light but are lacking in red light. These or any suitable light source may be used to provide light for the systems discussed above. Additionally, these light sources produce substantial amounts of UV light, which may degrade organic materials such as polycarbonate films. Specific embodiments covered in this patent can isolate the blue channel, which is most likely to contain the possibly damaging UV light. In these cases, inorganic half-wave plates such as those made from quartz can be used between PBSs 1104 and 1108 allowing for an organic material free, UV contaminated blue channel.

Although the exemplary embodiments described herein may be described in reference to specific colors or combinations of colors, it should be understood that other color combinations are also possible. For example, the CSPFs can be any combination of colors including Red/Blue, Blue/Green, Red/Green, an additive primary and its complementary subtractive primary or any other color pair as system criteria dictate.

As used herein, rotation is not limited to a pure optical rotation but also includes any transformation that results in optical transformation or other effects that result in apparent optical rotation. For example, a half-wave plate at 45° can transform a linear state into an orthogonal linear state via retardation but not through rotation.

Although several embodiments and its advantages have been described in detail, it should be understood that changes, substitutions, transformations, modifications, variations, permutations and alterations may be made therein without departing from the teachings of the present application, the spirit and the scope of the invention being set forth by the appended claims. Further, the reference in this application to "Invention" in the singular should not be used to argue that there is a single point of novelty claimed in this application. Multiple inventions may be set forth according to the limitations of the multiple claims associated with this patent specification, and the claims accordingly define the invention(s) that are protected thereby. In all instances, the scope of the claims shall be considered on their own merits in light of the specification but should not be constrained by the reference to "invention" included in this application.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components is the exemplary configurations may be implemented as a combined structure or component. These and other variations, modifications, additions, and improvements may fall within the scope of the invention as defined in the claims that follow.

The section headings in this application are provided for consistency with the parts of an application suggested under 37 CFR 1.77 or otherwise to provide organizational cues. These headings shall not limit or characterize the invention(s) set out in any patent claims that may issue from this application. Specifically and by way of example, although the headings refer to a "Field of the Invention," the claims should not be limited by the language chosen under this heading to describe the so-called field of the invention. Further, a description of a technology in the "Background" is not be construed as an admission that technology is prior art to the present application. Neither is the "Summary" to be considered as a characterization of the Invention(s) set forth in the claims to this application. Further, the reference in this specification to "invention" in the singular should not be used to argue that there is a simple point of novelty claimed in this application. Multiple inventions may be set forth according to the limitations of the multiple claims associated with this patent specification, and the claims accordingly define the invention(s) that are protected thereby. In all instances, the scope of the claims shall be considered on their own merits in light of the specification but should not be constrained by the headings included in this application.

What is claimed is:

1. A color management architecture for managing the light of three wavelength color spectra, wherein the second spectrum is in the middle of the three spectra, the architecture comprising:

a first reflective panel that modulates light of a first spectrum;

a second reflective panel that modulates light of a second spectrum;

a third reflective panel the modulates light of a third spectrum;

at least four polarizing beam splitting elements;

a projection lens;

wherein the light of the first and second spectra is transmitted through more of the at least four polarizing beam splitting elements than is the light of the third spectrum, which passes through at least one of the at least four polarizing beam splitting elements; and wherein the light of the first, second, and third spectra are combined and passed through the projection lens.

2. An architecture according to claim 1, wherein the third color spectrum is substantially blue.

3. A color management architecture for managing the light of three wavelength color spectra, wherein the second spectrum is in the middle of the three spectra, the architecture comprising:

a first reflective panel that modulates light of a first spectrum;

a second reflective panel that modulates light of a second spectrum;

a third reflective panel the modulates light of a third spectrum;

at least four polarizing beam splitting elements;

wherein the light of the first and second spectra is transmitted through more of the at least four polarizing beam splitting elements than is the light of the third spectrum, which passes through at least one of the at least four polarizing beam splitting elements; and wherein the third spectrum has a lower incoming light source intensity or a lower throughput efficiency through at least certain components of the color management architecture, whereby the light of the third spectrum, by being transmitted through fewer of the at least four polarizing beam splitting elements, is attenuated less than the light of the first and second spectra.

4. An architecture according to claim 3 and further comprising a projection lens, wherein the light of the first, second, and third spectra are combined and passed through the projection lens.

5. A color management architecture for managing the light of three wavelength color spectra, wherein the second spectrum is in the middle of the three spectra, the architecture comprising:
a first reflective panel that modulates light of a first spectrum;
a second reflective panel that modulates light of a second spectrum;
a third reflective panel that modulates light of a third spectrum;
at least four beam splitting elements;
wherein the light of the first and second spectra is transmitted through more of the at least four polarizing beam splitting elements than is the light of the third spectrum, which passes through at least one of the at least four polarizing beam splitting elements; and
an optical filter placed in the light path of at least the first spectrum and the second spectrum, wherein the optical filter comprises at least three retarders, which act as a half-wave plate to one of the first spectrum and the second spectrum and wherein the at least three retarders act as a half-wave plate with a $\pi/4$ displaced optical axis to light of the other of the first spectrum and the second spectrum.

6. An architecture according to claim 5 wherein the third spectrum is blue.

7. An architecture according to claim 5 wherein the third spectrum is red.

8. An architecture according to claim 5 wherein the optical filter is placed in the light path of the third spectrum in addition to the first spectrum and the second spectrum.

9. An architecture according to claim 8 wherein the optical filter acts as a half-wave plate to the light of the third spectrum.

10. An architecture according to claim 8 wherein the optical filter acts as a half-wave plate with a $\pi/4$ displaced optical axis to light of the third spectrum.

11. An architecture according to claim 8 wherein the beam splitting elements are selected from the group consisting of polarizing beam splitters and dichroic mirrors.

12. An architecture according to claim 5 wherein skew light polarization effects of at least one of the beam splitting elements is mitigated by skew light polarization effects of the optical filter.

13. A architecture according to claim 5 and further comprising a projection lens, wherein the light of the first, second, and third spectra are combined and passed through the projection lens.

14. A method of providing a color management system for managing the light of three wavelength color spectra, wherein the second spectrum is in the middle of the three spectra, the method comprising:
modulating a first spectrum of light with a first reflective panel;
modulating a second spectrum of light with a second reflective panel;
modulating a third spectrum of light with a third reflective panel;
wherein the light of the first and second spectra is transmitted through more of at least four polarizing beam splitting elements than the light of the third spectrum, which passes through at least one of the at least four polarizing beam splitting elements; and
wherein the third spectrum has a lower incoming light source intensity or a lower throughput efficiency through at least certain components of the color management system, whereby the light of the third spectrum, by being transmitted through fewer of the at least four polarizing beam splitting elements than is the light of the first and second spectra, is relatively less attenuated by its passing through the polarizing beam splitting elements of the color management system through which it passes.

15. A method according to claim 14, wherein the first, second, and third light spectra are combined and projected through a projection lens.

16. A method of providing a color management system for managing the light of three wavelength color spectra, wherein the second spectrum is in the middle of the three spectra, the method comprising:
separating the first, second, and third light spectra using at least two beam splitting elements;
modulating a first spectrum of light with a first reflective panel;
modulating a second spectrum of light with a second reflective panel;
modulating a third spectrum of light with a third reflective panel, wherein the light of the first and second spectra is transmitted through more of at least four polarization beam splitting elements than the light of the third spectrum, which passes through at least one of the at least four polarizing beam splitting elements; and
filtering light of at least the first spectrum and the second spectrum with an optical filter comprising at least three retarders, wherein the at least three retarders act as a half-wave plate to one of the first spectrum and the second spectrum and wherein the at least three retarders act as a half-wave plate with a $\pi/4$ displaced optical axis to light of the other of the first spectrum and the second spectrum.

17. A method according to claim 16, further comprising:
a first separating of light into two different paths; and
a second separating of light into two different paths; wherein a polarization transformation occurs after the first separating but before the second separating such that the polarization transformation is substantially skew ray compensating.

18. A method according to claim 16, further comprising:
a first combining of light into a single path; and
a second combining of light into a single path, wherein a polarization transformation occurs after the first combining but before the second combining such that the polarization transformation is substantially skew ray compensating.

19. A method according to claim 16 wherein the first, second, and third light spectra are combined and projected through a projection lens.

20. A method of providing a color management system for managing the light of three wavelength color spectra, wherein the second spectrum is in the middle of the three spectra, the method comprising:

modulating a first spectrum of light with a first reflective panel;

modulating a second spectrum of light with a second reflective panel;

modulating a third spectrum of light with a third reflective panel, wherein the light of the first and second spectra is transmitted more of at least four polarizing beam splitting elements than the light of the third spectrum, which passes through at least one of the at least four polarizing beam splitting elements and wherein the light of the first, second, and third spectra are combined; and projecting the three combined light spectra by a projection lens.

21. A color management architecture for managing the light of three wavelength color spectra, wherein the second spectrum is in the middle of the three spectra, the architecture comprising:

a first reflective panel that modulates light of a first spectrum;

a second reflective panel that modulates light of a second spectrum;

a third reflective panel that modulates light of a third spectrum;

at least four beam splitting elements; and an optical filter placed in the light path of at least two of the first spectrum, the second spectrum and the third spectrum, wherein the optical filter comprises at least three retarders, which act as a half-wave plate to at least one of the at least two, spectra, and wherein the at least three retarders act as a half-wave plate with a π/4 displaced optical axis to light of the other of the at least two spectra, whereby the optical filter is operable to compensate for skew ray polarization effects.

22. A color management architecture for managing the light of three wavelength color spectra, wherein the second spectrum is in the middle of the three spectra, the architecture comprising:

a first reflective panel that modulates light of a first spectrum;

a second reflective panel that modulates light of a second spectrum;

a third reflective panel that modulates light of a third spectrum;

at least four beam splitting elements; and an optical filter placed in the light path of at least the first spectrum and the second spectrum, wherein the optical filter comprises at least three retarders, which act as a half-wave plate to one of the first spectrum and the second spectrum, wherein the at least three retarders act as a half-wave plate with a π/4 displaced optical axis to light of the other of the first spectrum and the second spectrum, and wherein skew light polarization effects of at least one of the beam splitting elements is mitigated by skew light polarization effects of the optical filter.

23. A method of providing a color management system for managing the light of three wavelength color spectra, wherein the second spectrum is in the middle of the three spectra, the method comprising:

separating the first, second, and third light spectra using at least two beam splitting elements;

modulating a first spectrum of light with a first reflective panel;

modulating a second spectrum of light with a second reflective panel;

modulating a third spectrum of light with a third reflective panel;

filtering light of at least the first spectrum and the second spectrum with an optical filter comprising at least three retarders, wherein the at least three retarders act as a half-wave plate to one of the first spectrum and the second spectrum and wherein the at least three retarders act as a half-wave plate with a π/4 displaced optical axis to light of the other of the first spectrum and the second spectrum;

a first spectrum of light into two different paths; and a second separating of light into two different paths, wherein a polarization transformation occurs after the first separating but before the second separating such that the polarization transformation is substantially skew ray compensating.

24. A method of providing a color management system for managing the light of three wavelength color spectra, wherein the second spectrum is in the middle of the three spectra, the method comprising:

separating the first, second, and third light spectra using at least two beam splitting elements;

modulating a first spectrum of light with a first reflective panel;

modulating a second spectrum of light with a second reflective panel;

modulating a third spectrum of light with a third reflective panel;

filtering light of at least the first spectrum and the second spectrum with an optical filter comprising at least three retarders, wherein the at least three retarders act as a half-wave plate to one of the first spectrum and the second spectrum and wherein the at least three retarders act as a half-wave plate with a π/4 displaced optical axis to light of the other of the first spectrum and the second spectrum;

a first combining of light into a single path; and a second combining of light into a single path, wherein a polarization transformation occurs after the first combining but before the second combining such that the polarization transformation is substantially skew ray compensating.

25. A color management architecture for managing the light of at least three wavelength color spectra, the architecture comprising:

a first reflective panel that modulates light of a first spectrum;

a second reflective panel that modulates light of a second spectrum;

a third reflective panel that modulates light of a third spectrum;

at least four beam splitting elements; and an optical filter positioned optically between two of the at least four beam splitting elements, wherein skew light polarization effects between the two beam splitting elements are mitigated by the optical filter.

* * * * *